United States Patent
Deason et al.

(10) Patent No.: US 6,847,584 B2
(45) Date of Patent: Jan. 25, 2005

(54) METHOD AND APPARATUS FOR ACOUSTIC IMAGING OF OBJECTS IN WATER

(75) Inventors: Vance A. Deason, Idaho Falls, ID (US); Kenneth L. Telschow, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 10/611,388

(22) Filed: Jun. 30, 2003

(65) Prior Publication Data

US 2004/0264296 A1 Dec. 30, 2004

(51) Int. Cl.⁷ .................................................. G03H 3/00
(52) U.S. Cl. ............................................. 367/10; 367/7
(58) Field of Search ........................ 367/7, 10; 73/649, 73/655, 605

(56) References Cited

U.S. PATENT DOCUMENTS

| | | | | |
|---|---|---|---|---|
| 3,772,457 A | * | 11/1973 | Macovski | 367/10 |
| 3,869,904 A | * | 3/1975 | Gabor | 367/10 |
| 3,973,235 A | * | 8/1976 | van der Burgt | 367/7 |
| 4,518,992 A | | 5/1985 | Kessler et al. | |
| 4,905,202 A | * | 2/1990 | Robillard | 367/10 |
| 5,262,884 A | * | 11/1993 | Buchholz | 381/172 |
| 5,986,224 A | | 11/1999 | Kent | |
| 6,134,006 A | | 10/2000 | Telschow et al. | |
| 6,175,411 B1 | | 1/2001 | Telschow et al. | |
| 6,401,540 B1 | | 6/2002 | Deason et al. | |
| 6,486,962 B1 | | 11/2002 | Telschow et al. | |
| 6,552,841 B1 | | 4/2003 | Lasser et al. | |
| 2003/0053373 A1 | | 3/2003 | Erickson | |
| 2003/0058738 A1 | | 3/2003 | Erikson | |

* cited by examiner

*Primary Examiner*—Ian J. Lobo
(74) *Attorney, Agent, or Firm*—TraskBritt P.C.

(57) ABSTRACT

A method, system and underwater camera for acoustic imaging of objects in water or other liquids includes an acoustic source for generating an acoustic wavefront for reflecting from a target object as a reflected wavefront. The reflected acoustic wavefront deforms a screen on an acoustic side and correspondingly deforms the opposing optical side of the screen. An optical processing system is optically coupled to the optical side of the screen and converts the deformations on the optical side of the screen into an optical intensity image of the target object.

23 Claims, 6 Drawing Sheets

METHOD AND APPARATUS FOR ACOUSTIC IMAGING OF OBJECTS IN WATER

GOVERNMENT RIGHTS

This invention was made with Government support under Contract No. DE-AC07-99ID13727 awarded by the U.S. Department of Energy to Bechtel BWXT Idaho, LLC, and the Government has certain rights in this invention.

BACKGROUND OF THE INVENTION

1. Field of the Invention

This invention relates generally to methods and apparatus for imaging objects in a liquid environment and, more particularly, to imaging objects with acoustic waves.

2. State of the Art

Various types of acoustic imaging processes have been developed over the years in which an acoustic wave is used to collect information relating to certain features and structures of objects. Acoustic imaging processes are useful for applications where an opaque or semiopaque liquid such as oil or polluted water or solids, impair optical imaging approaches and techniques. Acoustic waves easily travel through such media and can provide images of objects in such liquid media.

Conventional acoustic imaging approaches have typically taken two approaches. In one approach, ultrasonic imaging techniques utilize an array of "microphones" to detect acoustic amplitude and phase changes and create an image based upon a reflected acoustic wave. With such an approach, acoustic images are formed from an analysis of amplitude and phase relationships between reflected acoustic signals at various points in the array. Such a direct acoustic detection system is limited in resolution based upon the practical fabrication limitations of the sensors and interaction of adjacent sensors. Even when piezoelectric pressure sensors are utilized, coarse resolutions of 100-by-100 pixels have become cumbersome due to signal routing and crosstalk shortcomings. Such a discrete or pixelized approach is limited in resolution, in large measure, to the coarse granularity of available sensor arrays. Furthermore, arrays fabricated from discrete transducer elements have limitations brought about by the number of elements and the complexity of the electronic readout of the information from the array.

A second conventional ultrasonic approach includes scanning or rasterizing a single "microphone" across a target object to detect the acoustic reflections at various times and spatial locations. Such an approach may employ a single acoustic pulse detected across a broad spatial region or may utilize successive acoustic pulses across the spatial region. Such a scanning approach requires significant control parameters to determine time delays from each sample and further requires consistent scanning control. Additionally, sophisticated signal processing of time delays and phasing of each sample imposes further resolution limitations on a system.

Both conventional approaches present pixelization of the acoustic image at an early stage and by rudimentary acoustic sensors. Consequently, a need exists for a method and apparatus for more readily imaging objects in a liquid environment that do not suffer from the shortcomings of the prior art approaches.

BRIEF SUMMARY OF THE INVENTION

The present invention is directed to a method and apparatus for acoustic imaging of objects in water or other liquids. In one embodiment of the present invention, an underwater imaging system is provided which includes an acoustic source for generating an acoustic wavefront which reflects from a target object as a reflected acoustic wavefront. The system further includes a screen partitioning the system into an acoustic portion and an optical portion. The acoustic portion located on the first side of the screen receives a reflected acoustic wavefront as reflected from the target object and physically deforms accordingly. The deformations on the first side are physically transferred to the second side of the screen. An optical processing system is optically coupled to the second side of the screen and converts the deformations on the second side of the screen resulting from the reflected acoustic wavefront into an optical intensity image of the target object.

In another embodiment of the present invention, an underwater camera is provided which includes a screen with a first acoustic side for deforming in response to a reflected acoustic wavefront from the target object and a second optical side that correspondingly deforms in response to the reflected acoustic wavefront. The camera further includes an optical processing system which converts the acoustic vibrations of the screen into an optical intensity image of the target object.

In another embodiment of the present invention, a method for imaging underwater objects is provided for a target object which is ensonified or "acoustically illuminated" with an acoustic wavefront. The acoustic wavefront reflects from the target object and deforms a first side of a screen with the second side of the screen deforming accordingly. The deformations on the second side are converted into an optical intensity image representative of the target object.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

A system, camera and method of imaging objects in a liquid environment, such as water, is illustrated with reference to FIG. 1. The various embodiments produce images by enabling direct optical imaging of the acoustic amplitude and phase of acoustic waves on a surface. Embodiments of the present invention enable full-field imaging and noncontacting ultrasonics for acoustical imaging in water or other liquids. Furthermore, embodiments of the present invention enable recording of acoustic motion on a plane at video frame rates by optical means similar to conventional optical cameras. Such an approach for imaging objects provides a high rate of measurement since an entire image may be recorded simultaneously. Furthermore, embodiments of the present invention do not present phasing of successive samples in a single image frame. Additionally, embodiments of the present invention utilize advancements in the field of video imaging for continued improvements to the acoustic, imaging as disclosed herein.

Figure 1:
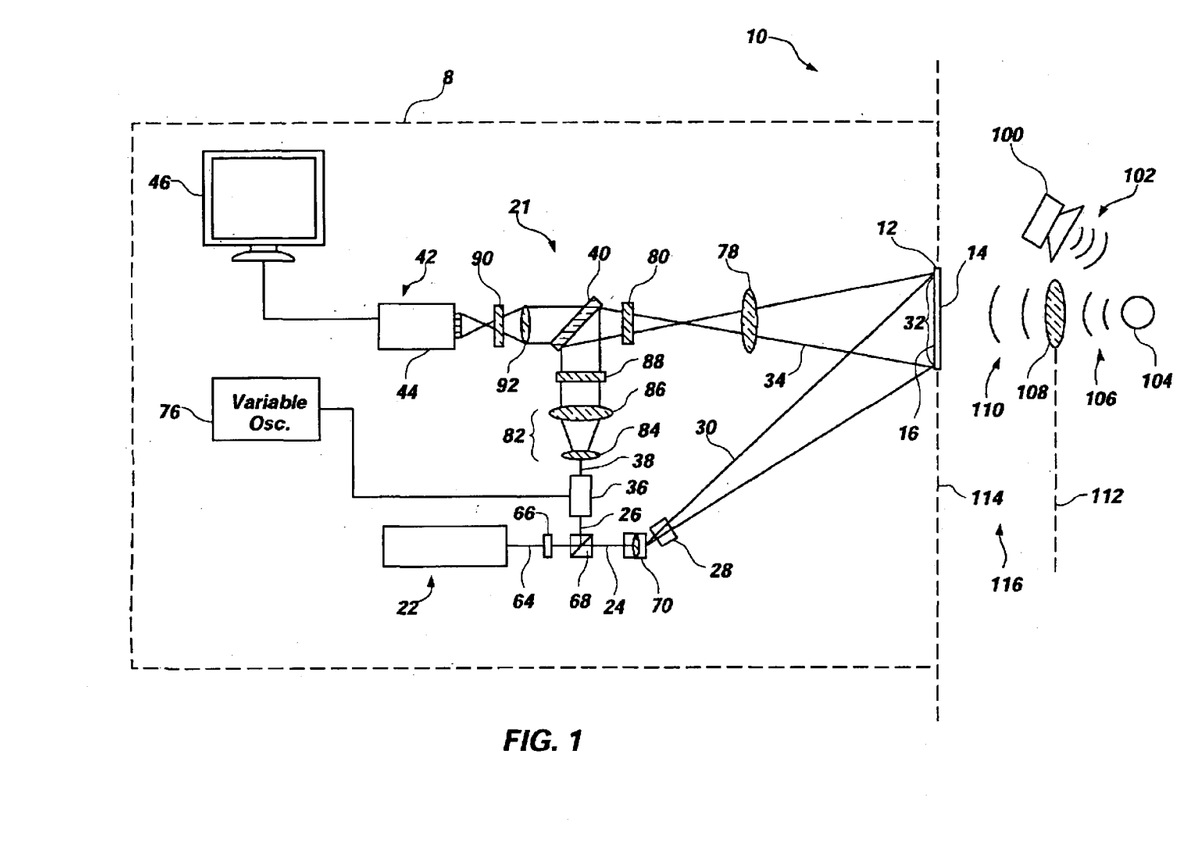
FIG. 1 is a schematic representation of a system for imaging objects in a liquid environment, in accordance with an embodiment of the present invention.

Referring to FIG. 1, the system 10 for imaging underwater target objects may comprise an excitation source such as an acoustic source or ensonifier 100. The ensonifier 100 is preferably configured to produce coherent continuous or tone burst mode acoustic waves at the desired frequency for ensonifying (i.e., illuminating with sound) the near vicinity of the target object and phase locked to the reference modulation placed on the optical phase modulator described later. The ensonifier 100 may take the form of a speaker or other more sophisticated acoustic source capable of generating a pressure or acoustic wavefront 102. The acoustic wavefront 102 propagates and impinges upon a target object 104 which reflects at least a portion of the acoustic waves as reflected acoustic waves, illustrated as reflected acoustic wavefront 106. The reflected acoustic waves may propagate directly to a pressure sensitive screen 12 or may optionally encounter an intermediate wave conditioning means. One such wave conditioning means within an embodiment of system 10 may include an acoustic lens 108 which acoustically modifies reflected acoustic wavefront 106 into refracted acoustic wavefront 110. The acoustic lens 108 collects the reflected acoustic waves reflected from the target object and focuses them as an acoustic image. Acoustic lens 108 may provide acoustic focusing of the reflected acoustic wavefront prior to the wavefront impinging upon screen 12. The functionality of acoustic lens 108 is appreciated by those of ordinary skill in the art and is not further discussed herein.

The reflected wavefront 106, or 110 when an acoustic lens is present, impinges upon screen 12 and causes a corresponding deformation of the first or acoustic side 14 of screen 12. The acoustic imaging screen 12 serves to collect the reflected acoustic waves and converts the local acoustic pressure into a corresponding pattern of vibrations (e.g., deformations) on the screen. The deformation from the acoustic side 14 couples to the second or optical side 16 and exhibits a corresponding deformation. The screen 12 locally deforms from the local pressure gradients in the acoustic wave. The screen 12 is preferably compliant so as to minimally alter or influence the acoustic waves. That is screen 12, and alternative embodiments thereof, is preferably of a thickness much less than the wavelength of the acoustic waves being sensed or are of interest. For example, if the acoustic waves are about 1 mm long for a particular application, screen 12 ideally, but not necessarily, would be much less than about 1 mm in thickness. Furthermore, the optical side may be optimized for optical efficiency by making it retroreflective or by shaping it into a curve that may reflect the optical object beam more efficiently back to the optical imaging lens on the optical side.

The screen, or membrane, 12 is preferably comprised of a material that minimizes dampening of the deformation between the acoustic side 14 and the optical side 16. Furthermore, the screen 12 preferably is comprised of a material that is compliant to further minimize alterations to the reflected wavefront passing through the screen from the acoustic side 14 to the optical side 16. Screen 12 and subsequently described alternative embodiments thereof, may be made of materials such as commercially available thin polymers, plastics, cloths, and even metals. A thin screen with holes much smaller than the acoustic wavelengths of interest will let fluid pass there through for pressure balancing. Furthermore, screens may serve as a phase separation boundary between two immiscible fluids. Screen 12 preferably reflect light, so such screens, or membranes, may be coated with a metal or some other appropriately reflective material which effectively reflect the optical wavelength of interest. The optical-side screen displacement induced in the screen 12 by the ensonifier 100 is detected and imaged with the aid of a photorefractive imaging system 21. In the embodiment shown and described herein, the photorefractive imaging system 21 may comprise a light source assembly 22 which produces two mutually coherent light beams or wavefronts: an object beam or wavefront 24 and a reference beam or wavefront 26. An optical beam confining and directing device 28 operatively associated with the object beam 24 spreads and directs the object beam 24 onto the screen 12 as an expanded object beam 30. In the preferred embodiment, beam 30 would be made collinear with beam 34 through the use of a polarizing beam splitter between items 78 and 80, as is well known by those in the optics field. The expanded object beam 30 illuminates a two-dimensional area or region 32 on the screen 12. Thereafter, the screen 12 modulates the phase of the expanded object wavefront or beam 30 to form a phase modulated object wavefront or beam 34.

The reference beam or wavefront 26 produced by the light source assembly 22 is directed through a optical beam phase modulator 36 to produce a modulated reference beam 38. As will be further explained below, the beam modulator 36 modulates the phase of the reference beam 26 at a frequency that is slightly different than the frequency of the optical-side screen displacement frequency sought to be detected on the screen 12. The modulated reference beam or wavefront 38 is then directed toward a sensing medium 40 wherein the modulated reference beam 38 is combined with the modulated object beam 34 reflected by the screen 12.

In the embodiment shown and described herein, the sensing medium 40 may comprise a photorefractive material, such as a bismuth silicon oxide crystal. As used herein, the term "photorefractive" refers to those materials wherein the space charge electrical grating can be either in-phase or out-of-phase with the optical interference pattern. When the modulated object and reference beams 34 and 38 are combined within the photorefractive sensing medium 40, they create a space charge field (not shown) having a magnitude and spatial distribution that is directly proportional to the optical phase difference between the object and reference optical wavefronts at all points in the optical image from screen 12. The space charge field modulates the local refractive index of the sensing medium 40 (via the electro-optical effect), creating a diffraction grating within the sensing medium 40 that embodies the static and low-frequency phase information between the object and reference optical beams. The result is the formation of a hologram (not shown) which may be used to reconstruct an image, through the well known 2-wave or 4-wave mixing process, of the desired elastic wave displacement distribution operating, usually, at a higher frequency on the screen 12 through the heterodyne mixing operation occurring within the photorefractive material. The intensity variations of the reconstructed image are approximately proportional to the higher frequency phase differences between the modulated object and reference beams 34 and 38, respectively, for phase differences less than approximately 0.1 radian. The reading-out of the hologram to reconstruct the image of the acoustic wave can be performed by the same light source as indicated in FIG. 1 for the out-of-phase gratings. For the in-phase gratings, a separate independent light source at a different wavelength may be used by employing the appropriate Bragg angle to reconstruct the image of the ultrasonic wave.

The photorefractive material comprising the sensing medium 40 has a limited response time, i.e., cut-off frequency. Consequently, the photorefractive sensing medium 40 will not record interference patterns having frequencies above the cut-off frequency of the sensing medium 40. Since the reference beam 26 is modulated at a frequency that is very close to, but not the same as, the frequency of the deformation of the reflected acoustic wavefront in the screen 12, and since the difference between the frequencies is optimally less than the cut-off frequency of the photorefractive sensing medium 40, the image reconstructed from the hologram (not shown) produced by the photorefractive sensing medium 40 moves at a speed that is related to the frequency difference between the modulated object beam 34 and the modulated reference beam 38. Moreover, since the cut-off frequency of the photorefractive sensing medium 40 is generally lower than the acoustic wave frequency, the photorefractive sensing medium 40 will not record disturbances and waves if the frequencies of the disturbances and waves are such that the differences between those frequencies and the frequency of the modulated reference beam are greater than the cut-off frequency of the photorefractive sensing medium 40. Stated simply; the photorefractive sensing medium 40 functions as a mixer and as a low pass filter, recording only those interference patterns having frequencies less than the cut-off frequency of the photorefractive sensing medium 40.

The image reconstructed from the hologram produced within the photorefractive sensing medium 40 may be detected by suitable array (i.e., two-dimensional) detector 42, such as a video camera 44. In an alternative embodiment, the image may be directly observed by the human eye via an eyepiece (not shown) or other such device. If a video camera 44 is used to detect the reconstructed image, the video camera 44 may be connected to a display device 46, such as a CRT or LCD panel, suitable for displaying the reconstructed image. In the stereoscopic embodiment of FIG. 8 or in a portable application, display device 46 may further include portable or wearable displays that allow a user to view the optical image in stereo, or in the case of a single optical processing system 8, allows the user to view the optical image on a portable display device 46. Alternatively, the image captured by the video camera 44 may be recorded on a suitable medium (e.g., video tape) for later playback and/or analysis.

The system 10 includes a "dry side" and a "wet side" partitioned by an illustrative isolation boundary wherein various portions of the apparatus reside and method is performed. A combination of two separate embodiments are illustrated with respect to FIG. 1, namely the reflected acoustic waves may propagate directly to a pressure sensitive screen 12 or may optionally encounter an intermediate wave conditioning means. In a first embodiment, system 10 exposes screen 12 directly to the pressure waves of reflected acoustic wavefront 106. In such an embodiment, the wet side is partitioned separate from the dry side by an isolation boundary 114 which is implemented as a physical boundary. In such an embodiment, optical processing system 8 is included on the dry side while the remaining underwater environment becomes the wet side of the system. Due to harsh environmental concerns with respect to the present embodiment, screen 12 should be resilient and address conditions relating to the mobility of optical processing system 8 and the acoustical artifacts further relating thereto.

In another embodiment illustrated by the relocation of the isolation boundary to boundary 112, system 10 further includes an acoustic lens 108 which provides acoustical focusing of the reflected acoustic wavefront prior to their arrival at screen 12. In such an embodiment, the cavity or region 116 formed by the addition of acoustic lens 108 to the system 10 is preferably filled with a fluid capable of propagating the lens-modified reflected acoustic wavefront to screen 12.

More specifically, in the embodiments shown and described herein, the photorefractive imaging system 21 may comprise a photorefractive imaging system of the type shown and described in U.S. Pat. No. 6,175,411 entitled "Apparatus and Method for Measuring and Imaging Traveling Waves" of Telschow and Deason, which is incorporated herein by reference. Briefly, the photorefractive imaging system 21 may comprise a light source assembly 22 which produces two mutually coherent light beams or wavefronts: An object beam or wavefront 24 and a reference beam or wavefront 26. The object and reference beams 24 and 26 are preferably derived from a single, coherent source beam 64 produced by the light source assembly 22.

The light source assembly 22 which may be used to generate the single, coherent source beam 64 may comprise any of a wide range of lasers that are now known in the art or that may be developed in the future that would be suitable for producing such a coherent source beam 64. By way of example, in the embodiment of the present invention, the light source 22 may comprise a 100 milliwatt (mw) frequency doubled, diode pumped solid state laser having a wavelength of 532 nm, such as a Coherent Verdi® laser available from Coherent, Inc. of Santa Clara, Calif. Alternatively, lasers having other output powers and beam wavelengths could also be used.

The source beam 64 produced by the light source assembly 22 (e.g., laser) first may be directed through a halfwave plate 66 before being directed to a beam splitter 68 which splits the source beam 64 into the object beam 24 and the reference beam 26. Thereafter the object beam 24 may be directed to a beam confining and directing device 28 which directs the object beam 24 onto the screen 12 as an expanded object beam 30. While any of a wide (range of components or combinations of components may be used to direct the object beam 24 onto the screen 12, in one exemplary embodiment, the beam directing device 28 may comprise a beam expansion lens 70. Such an arrangement converts the object beam 24 into an expanded, generally cone-shaped beam 30 and allows the expanded beam 30 to be conveniently directed onto the desired portion of the screen 12 to illuminate a two-dimensional area or region 32 thereof.

The various components described above (e.g., beam splitter 68 and expanding lens assembly 70) for producing the expanded object beam 30 and for directing it onto the screen 12 may comprise any of a wide range components and devices that are well-known in the art and readily commercially available. Consequently, the particular beam splitter 68 and expanding lens assembly 70 which may be utilized in one exemplary embodiment of the present invention will not be described in further detail herein.

The deforming screen 12 modulates the phase of the expanded object beam 30 to produce modulated object beam 34. Thereafter, phase modulated object beam 34 is collected by a collection lens 78 which focuses the modulated object beam 34 onto the photorefractive sensing medium 40. A polarizer 80 positioned between the collection lens 78 and the photorefractive sensing medium 40 may comprise a high extinction ratio polarizer to select one polarization component of the modulated object beam 34 for passage onto the photorefractive sensing medium 40.

The reference beam 26 emerging from the beam splitter 68 is directed through a beam modulator 36 which modulates the phase of the reference beam 26 to produce a modulated reference beam 38. In the embodiment shown and described herein, the beam modulator 36 comprises an electro-optic modulator of the type well-known in the art for modulating the phase of the reference beam 26. A variable oscillator 76 of the type that is also well-known in the art and operatively associated with the beam modulator 36 allows the beam modulator 36 to modulate the phase of the reference beam 26 in a phase-locked manner and at a frequency that is slightly different than the frequency of the phase modulation of the modulated object beam 34. For example, and as will be described in greater detail below, the variable oscillator 76 may be adjusted so that the beam modulator 36 modulates the phase of the reference beam at a frequency differing from the object wave modulation frequency by about, for example, 25 Hz. Alternatively, other frequencies may also be used as would be obvious to persons having ordinary skill in the art.

After being modulated by beam modulator 36, the modulated reference beam 38 may be expanded by a suitable beam expander assembly 82 which, in one exemplary embodiment may comprise a pair of lenses 84 and 86. A polarizer 88 positioned between the beam expander assembly 82 and the photorefractive sensing medium 40 selects (i.e., discriminates) a polarization component of the modulated reference beam 38 for passage to the photorefractive sensing medium 40. Polarizer 88 may comprise a high extinction ratio polarizer of the type well known in the art and readily commercially available.

Since the modulated reference beam 38 has been modulated at a rate that is very close to but different than the frequency of the deformation caused by the reflected acoustic wavefront, the phase related features such as interference fringes produced by mixing of the object and reference beams of the reconstructed image will move at a speed that is related to the frequency difference between the modulated object beam 34 and the modulated reference beam 38. Since, as was mentioned above, the photorefractive material comprising the sensing medium 40 has an intrinsic response time (i.e., cut-off frequency), the offset or difference frequency between the modulated object and reference beams 34 and 38 must be below the cut-off frequency of the photorefractive material for improved results. If the difference frequency is too great, the resulting interference pattern will move so rapidly that the photorefractive material will fail to record the change.

The bismuth silicon oxide material which may comprise the photorefractive sensing medium 40 in one embodiment of the present invention has a high frequency cut-off of about 67 Hz, that increases with optical power. Alternatively, photorefractive sensing media having other high frequency cut-offs (e.g., high frequency cut-offs of about 1 kHz) are known and may be used as well. In any event, in order to detect deformation from the reflected acoustic wavefront with the highest response, the reference beam 26 should be modulated at a frequency so that the difference frequency between the modulated reference beam 38 and the modulated object beam 34 does not exceed the high frequency cut-off of the photorefractive sensing medium 40. In accordance with the foregoing considerations, then, the variable oscillator 76 in one embodiment of the present invention is set to modulate the phase of the reference beam at a frequency that is about ±25 Hz from the frequency of the modulated object beam 34. For example, if it is desired to examine deformations having frequencies of about 40 kHz, then it will be desirable to modulate the phase of the reference beam 26 at a frequency of about 40 kHz±25 Hz. Similarly, if deformations of reflected acoustic waves having frequencies of about 100 kHz are to be examined, then the reference beam should be modulated at a frequency of about 100 kHz±25 Hz.

The holographically reconstructed image produced by the photorefractive sensing medium 40 may be observed by means of a suitable array (i.e., two-dimensional) detector 42, such as a CCD-type video camera 44. Alternatively, the image may by directly observed by the human eye via an eyepiece (not shown) or other such device. Generally speaking, for optically active materials such as BSO, it will be desirable to adjust the thickness of the sensing medium 40 in order to achieve a 90° polarization shift between the diffracted modulated reference beam 38 and the transmitted modulated object beam 34. Such a polarization shift enables the directly transmitted object beam 34 to be eliminated by a properly oriented polarizer 90 positioned between the detector 42 and photorefractive sensing medium 40. Finally, depending on the type of detector utilized, it may be necessary to position an imaging lens 92 between the detector 42 and the photorefractive sensing medium 40.

If a video camera 44 is used to detect the image, the video camera 44 may be connected to a suitable display device 46, such as a CRT monitor or LCD panel, suitable for displaying the image. Optionally, the image captured by the video camera 44 may be recorded on a suitable medium (e.g., digital media or video tape) for later playback and/or analysis.

Figure 2:
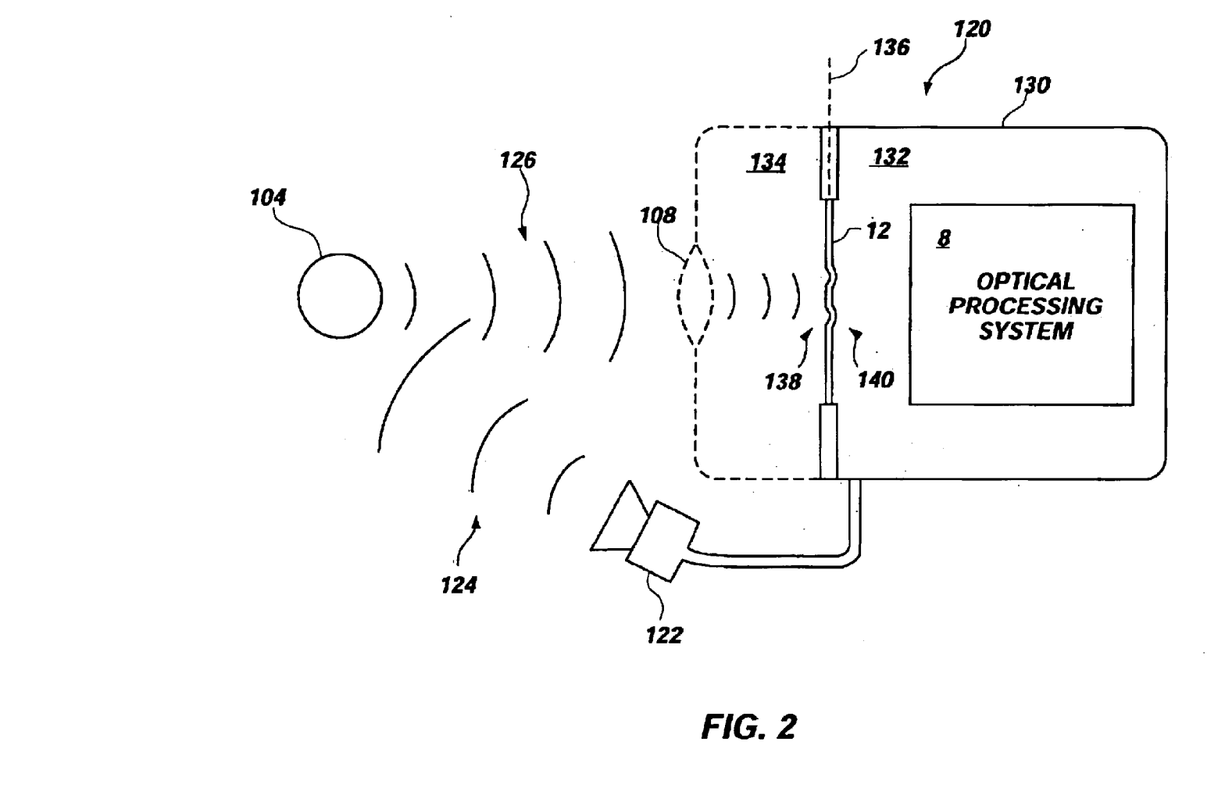
FIG. 2 is a cross-sectional diagram of a camera for imaging underwater objects, in accordance with an embodiment of the present invention.

The system 10 for imaging underwater target objects may also be incorporated into an underwater camera configuration for remote applications. In FIG. 2, a camera 120 embodies specific aspects of the system 10 of FIG. 1. In the present embodiment, a camera 120 is illustrated as being configured in a portable submersible configuration suitable for imaging a target object 104 in an underwater application. Camera 120 may include an attached excitation source such as an acoustic source or ensonifier 122. An ensonifier 122 may take the form of a speaker or other more sophisticated acoustic source capable of generating a pressure or acoustic wavefront 124. The acoustic wavefront 124 propagates and impinges upon a target object 104 which reflects at least a portion of the acoustic waves in acoustic wavefront 124 as reflected acoustic waves, illustrated as acoustic wavefront 126.

In a separate embodiment, ensonifier 122 may be detached from camera 120 as an independent acoustic wave source. In yet a further embodiment, camera 120 may rely upon manmade or natural acoustic or pressure wave-generating phenomenon for obtaining reflected acoustic waves, providing as long as suitable synchronization between the natural source and the reference beam modulation can be achieved.

The camera 120 includes a housing 130 that is partitioned by an illustrative isolation boundary 136 into a dry side or region, generally illustrated as 132, and a wet side or region, generally illustrated as 134. A combination of two separate embodiments are illustrated with respect to FIG. 2, namely the reflected acoustic waves 126 may propagate directly to a pressure sensitive screen 12 or may optionally encounter an intermediate wave conditioning means. In a first embodiment, camera 120 exposes screen 12 directly to the pressure waves of reflected acoustic wavefront 126. In such an embodiment, the wet side 134 of camera 120 becomes the entire underwater environment.

In another embodiment illustrated by the addition of dashed lines in FIG. 2, the camera 120 further includes an acoustic lens 108 which provides acoustical focusing of the reflected acoustic wavefront prior to their arrival at screen 12. In such an embodiment, the cavity formed by the addition of acoustic lens 108 to camera 120 is preferably filled with a fluid capable of propagating the lens-modified reflected acoustic wavefront to screen 12.

In addition to the housing 130, the camera 120 of FIG. 2 further includes a screen 12 for relaying deformations received on the acoustic side 138 of screen 12 and propagating them to an optical side 140 of screen 12. As stated, the specific composition of screen 12 may vary depending upon the environmental exposure of screen 12. The camera 12 further comprises an optical processing system 8 for converting the acoustically-induced deformations from screen 12 into optical intensity images representative of the target object 104. The specifics of the optical processing system 8 are described above and may include specific modifications for enhancing portability.

Figure 3:
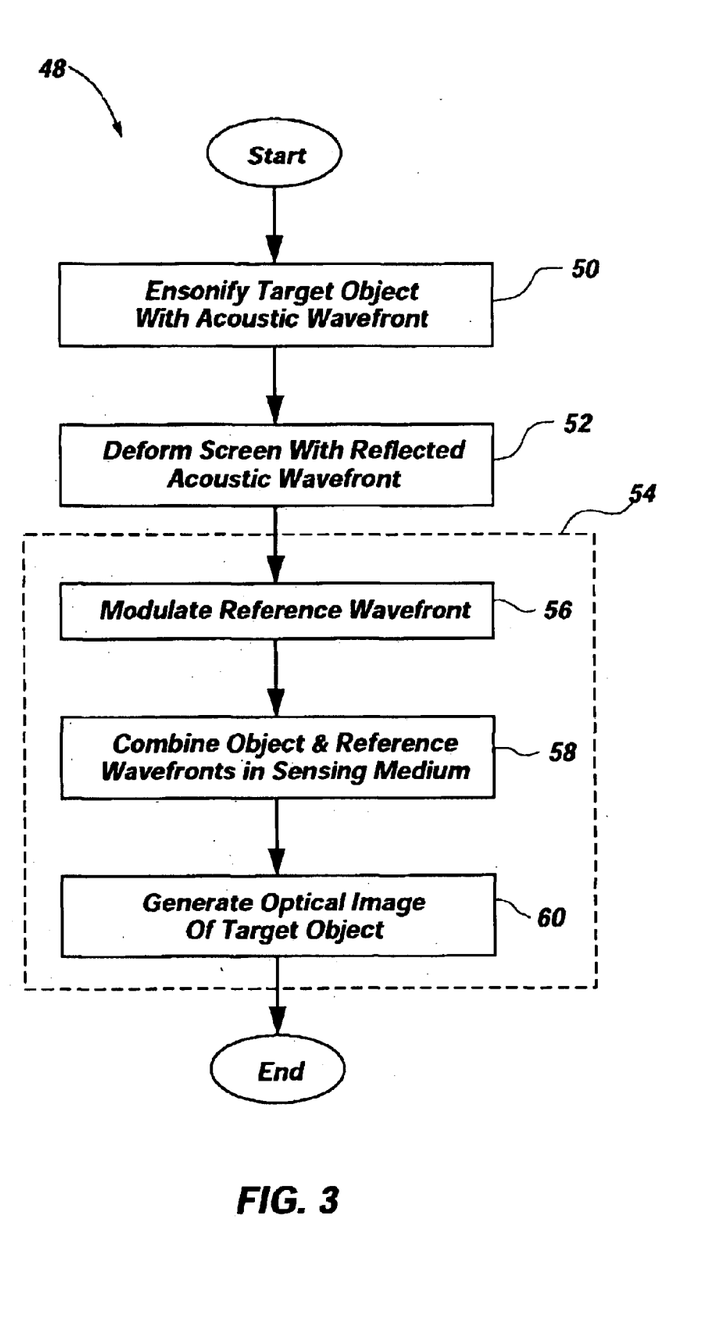
FIG. 3 is a flowchart of a method for imaging an underwater object, in accordance with an embodiment of the present invention.

The system 10 for imaging underwater target objects 104 may be operated according to the method 48 illustrated in FIG. 3 in order to image an underwater target object. The method ensonifies 50 a target object with acoustic waves projected as an acoustic wavefront bombarded about the target object. The target object reflects the acoustic wavefront as a reflected acoustic wavefront which further encounters and deforms 52 a first or acoustic side of a screen. The second or optical side of the screen is responsive to the deformation of the first side which results in a corresponding deformation.

Subsequent processing generally converts 54 the acoustic waves as received at the screen 12 (FIG. 1), from their respective screen deformations into optical intensity images representative of the target object. Specifically, the deformation of screen 12 modulates the phase of the expanded object beam 30 to form a modulated object beam 34 (FIG. 1). Subsequently, the phase of the reference beam or wavefront 26 is modulated 56 to produce a modulated reference beam 38. As previously described, the phase of the reference beam 26 is modulated at a frequency that is slightly different than the frequency of the acoustic wave that is to be detected. The modulated object beam 34 and modulated reference beam 38 are then combined 58 within the photorefractive sensing medium 40 which produces a hologram (not shown) from which may be reconstructed an image of the screen displacement on the optical side of the screen 12. An optical intensity image is generated 60 as a result of the received acoustic wavefront.

Figure 4:
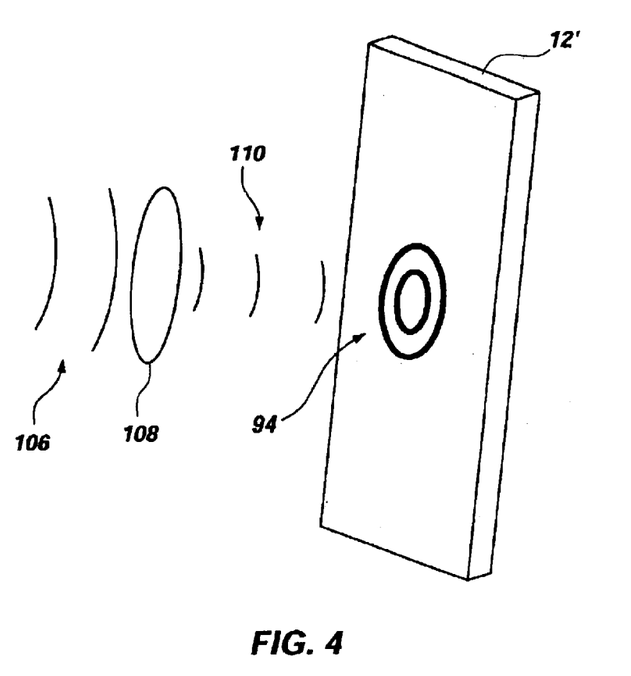
FIG. 4 is a diagram illustrating one configuration of a screen, in accordance with an embodiment of the present invention.

FIG. 4 illustrates one formation of the screen, in accordance with an embodiment of the present invention. In the present embodiment, the screen is illustrated as screen 12' formed as a rigid screen configured to also function as an isolation boundary for separating the wet and dry sides when an acoustic lens 108 is not present or, alternatively, to function as the isolation barrier to the dry side when the acoustic lens 108 is utilized. In the present embodiment, screen 12' is configured as a monolithic arrangement comprised of one of various suitable materials, an example of which may include glasses or plastics which facilitate deformation from an acoustic side to an optical side with minimization of dampening and fringe deformation about the acoustic image 94 as generated when the acoustic wavefront impinges upon the screen 12'.

Figure 5:
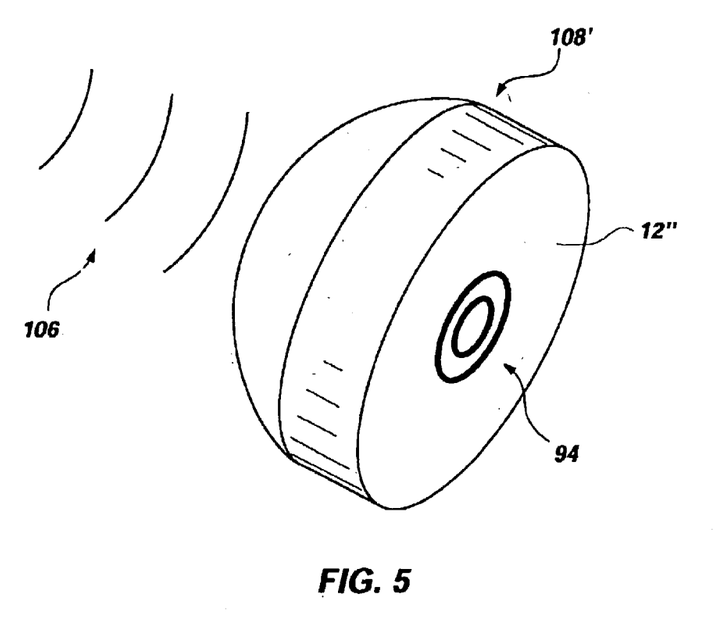
FIG. 5 is a diagram illustrating another configuration of a screen integrally coupled with an acoustic lens, in accordance with another embodiment of the present invention.

FIG. 5 illustrates a screen and acoustic lens in accordance with another embodiment of the present invention. The present embodiment integrates an acoustic lens and the screen by forming a screen 12" as a facet of an acoustic lens 108'. Integration of screen 12" with acoustic lens 108' reduces the bulk and weight associated with system 10 and camera 120. As illustrated, the acoustic image 94 is formed from the deformations resulting on screen 12" which may be optically processed by optical processing system 8 (FIG. 1). In this embodiment, the screen may consist of a material specifically chosen to enhance the amplitude of the acoustic vibrations through proper choice of physical properties.

Figure 6:
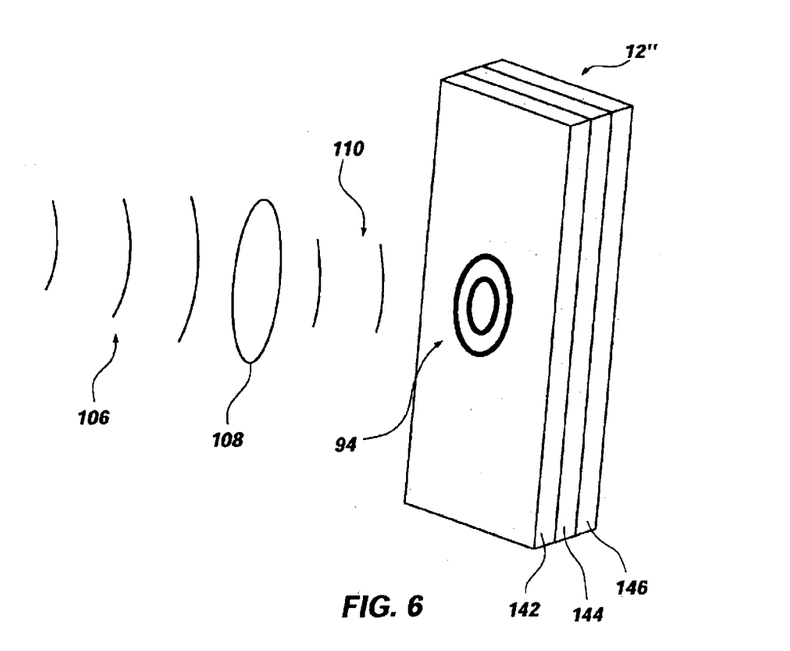
FIG. 6 is a diagram illustrating yet another configuration of a screen, in accordance with another embodiment of the present invention.

FIG. 6 illustrates a screen implemented in accordance with yet another embodiment of the present invention. In the present embodiment, screen 12" is implemented as multiple layers configured to provide resiliency against a liquid application on the acoustic side. As illustrated, the acoustic screen 12" is comprised of an imaging screen 142 implemented as a pressure sensitive material which is further backed by pressure compensating liquid 144. The pressure compensating liquid 144 neutralizes the pressure associated with the pressure associated with either the wetside liquid environment of the target object or, in the case of an acoustic lens 108, the intermediate cavity between the acoustic lens 108 and the screen 12". Compensating liquid 144 may be any liquid such as water, oil, silicone liquids, or any other inert liquid. The screen 12" of the present embodiment is further backed by a rigid backplane 146 for coupling with the optical side of the system.

Figure 7:
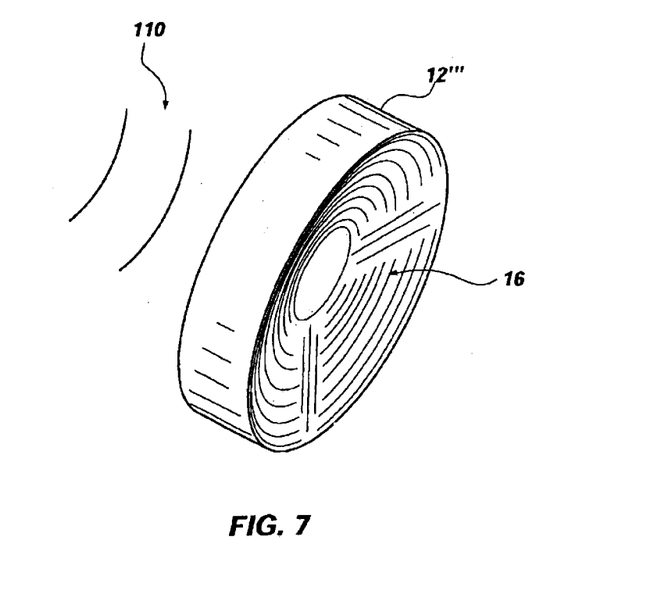
FIG. 7 is a diagram illustrating yet a further configuration of a screen, in accordance with another embodiment of the present invention.

FIG. 7 illustrates a screen implementation in accordance with yet a further embodiment of the present invention. In the present embodiment, screen 12'" is configured for improved optical efficiency by contouring the optical side 16 of screen 12" into a curve configuration to improve the optical reflectivity of the object beam back to the optical imaging lens in optical processing system 8.

Figure 8:
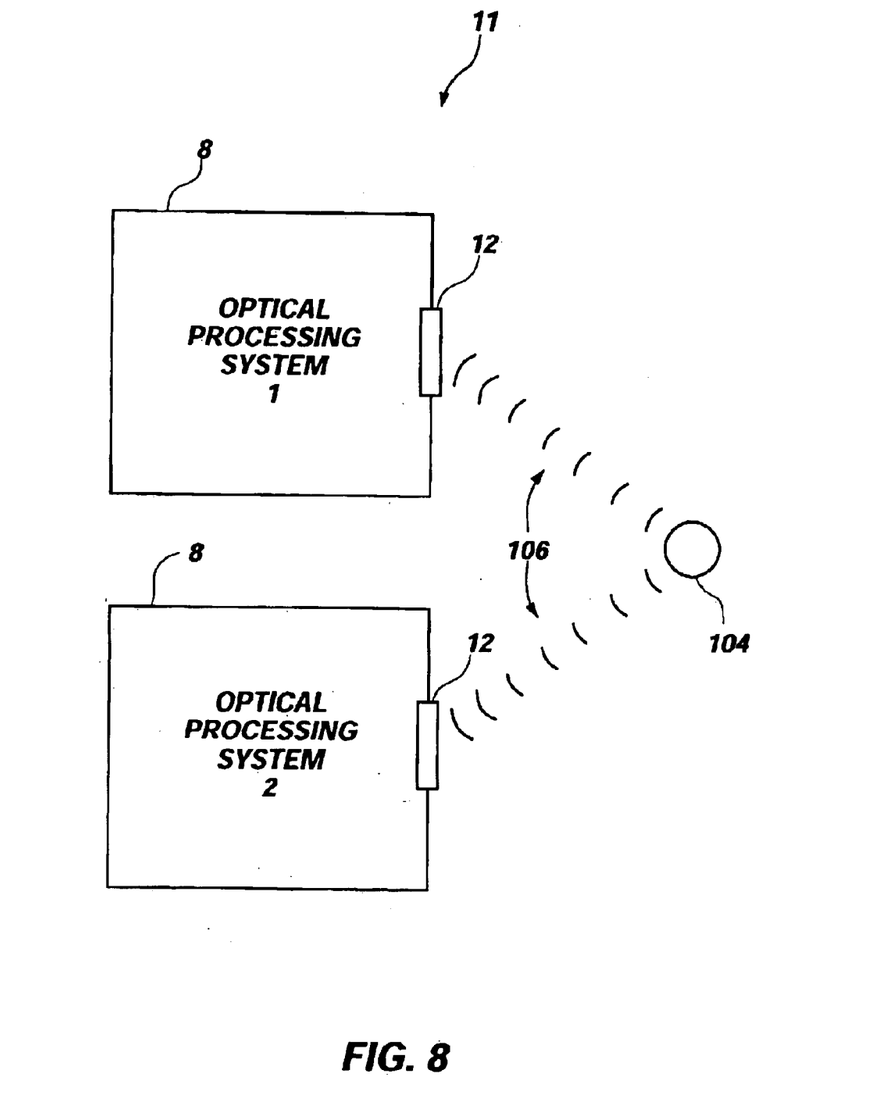
FIG. 8 is a schematic representation of a system for stereophonically imaging objects in a liquid environment, in accordance with an embodiment of the present invention.

FIG. 8 illustrates a stereoscopic system, in accordance with an embodiment of the present invention. A stereoscopic system 11 includes a plurality of optical processing systems 8 arranged to receive spatially-diverse reflected acoustic wavefronts 106 at separate screens 12 to generate separate optical intensity images of target object 104. The resultant optical images may then be projected in display systems configured for stereophonic presentation to a user. In the preferred implementation, both beams 106 could be demodulated by a single photorefractive element, with independent reconstructed images recorded by independent cameras.

A significant advantage associated with the method and apparatus according to the present invention is that it provides an acoustic imaging means for imaging target objects in liquids that inhibit direct optical imaging techniques. While conventional optical only imaging techniques may have provided greater image resolution, the combination of acoustic and optical imaging is an advancement over acoustic-only imaging techniques.

Another significant advantage of the present invention is that pixilation, meaning conversion from a continuous or analog form to a discrete or digitized form, occurs in the optical portion of the system rather than in the acoustic portion. Since spatial resolution of the image number of pixels in the optical or video camera, typically in the megapixel range, spacial resolutions of the object geometry are limited only by the acoustic wavelength employed. Because of the novel partitioning of the apparatus and method of the present invention, an improved resolution or pixelization is obtained thereby enabling improved imaging resolution.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An underwater imaging system, comprising:
    an acoustic source configured to generate an acoustic wavefront for impinging upon a target object;
    a first screen having first and second sides, said first side configured to receive a reflected acoustic wavefront as reflected from said target object, said first and second sides further configured to physically deform in response to said reflected acoustic wavefront said first screen further comprising a pressure compensating layer internally adjacent to said first side to neutralize underwater pressure against said first screen; and
    a first optical processing system optically coupled to said second side of said first screen for converting said reflected acoustic wavefront on said second side of said first screen to a first optical intensity image of said target object.

2. The system of claim 1, further comprising an acoustic lens arranged between said target object and said first screen and further configured to acoustically process said reflected acoustic wavefront.

3. The system of claim 2, wherein said first screen and said acoustic lens are integral and said first screen is formed as a facet of said acoustic lens.

4. The system of claim 1, wherein said first screen is further configured to partition said system into a wet side and a dry side and wherein said optical processing system is arranged on said dry side.

5. The system of claim 4, further comprising an acoustic lens arranged on said wet side between said target object and said first screen.

6. The system of claim 1, wherein said first screen is configured as a monolithic screen to directly physically deform from said first side to said second side.

7. An underwater imaging system, comprising:
    an acoustic source configures to generate an acoustic wavefront for impinging upon a target object;
    a first screen having first and second sides, said first side configured to receive a reflected acoustic wavefront as reflected from said target object, said first and second sides further configured to physically deform in response to said reflected acoustic wavefront; and
    a first optical processing system optically coupled to said second side of said first screen for converting said reflected acoustic wavefront on said second side of said first screen to a first optical intensity image of said target object,
    wherein said first screen comprises:
        an imaging screen configured to receive a reflected wavefront and physically deform in response thereto;
        a pressure compensating layer internally adjacent to said imaging screen and configured to neutralize underwater pressure against said imaging screen; and
        a rigid backplane adjacently coupled to said pressure compensating layer and further configured for coupling with said first optical processing system.

8. An underwater imaging system, comprising:
    an acoustic source configured to generate an acoustic wavefront for impinging upon a target object;
    a first screen having first and second sides, said first side configured to receive a reflected acoustic wavefront as reflected from said target object, said first and second sides further configured to physically deform in response to said reflected acoustic wavefront;
    a first optical processing system optically coupled to said second side of said first screen for converting said reflected acoustic wavefront on said second side of said first screen to a first optical intensity image of said target object; and
    a second screen and a second optical processing system configured to generate a second optical intensity image of said target object, said second screen and second optical processing system spatially separated from said first screen and said first optical processing system to form a stereophonic optical image of said target object.

9. A method for imaging underwater objects comprising:
    ensonifying a target object with an acoustic wavefront;
    deforming a first side of a first screen and a second side of said first screen in response thereto with a reflected acoustic wavefront as reflected by said target object;
    pressure compensating said first screen with a pressure compensating layer internally adjacent to said first screen to neutralize underwater pressure against said first screen; and
    converting said reflected acoustic wavefront on said second side of said first screen into a first optical intensity image of said target object.

10. The method of claim 9, wherein said converting comprises:
    modulating a reference wavefront with deformations on said second side of said first screen;
    combining in a sensing medium an object wavefront with said reference wavefront as modulated; and
    generating a first optical intensity image of said target object as combined in said sensing medium.

11. The method of claim 9, wherein said converting comprises:
    projecting an optical wavefront on said second side of said first screen; and
    generating a first optical intensity image of said target object from modulation of said first optical wavefront induced by deformations of said first screen from said reflected acoustic wavefront.

12. The method of claim 9, further comprising acoustically modifying said reflected acoustic wavefront between said target object and said first screen through an acoustic lens.

13. The method of claim 9, further comprising acoustically modifying said reflected acoustic wavefront between said target object and said first screen through an acoustic lens, said first screen and said acoustic lens being integrally arranged.

14. A method for imaging underwater objects comprising:

esonifying a target object with an acoustic wavefront;

deforming a first side of a first screen and a second side of said first screen in response thereto with a reflected acoustic wavefront as reflected by said target object;

converting said reflected acoustic wavefront on said second side of said first screen into a first optical intensity image of said target object;

deforming a first side of a second screen and a second side of said second screen in response thereto with a reflected acoustic wavefront as reflected by said target object; and converting said reflected acoustic wavefront on said second side of said second screen into a second optical intensity image of said target object, said first and second optical intensity image forming a stereophonic optical intensity image of said target object.

15. An underwater camera, comprising:

a first screen having first and second sides, said first side configured to receive a reflected acoustic wavefront as reflected from a target object, said first and second sides further configured to physically deform in response to said reflected acoustic wavefront;

a first optical processing system optically coupled to said second side of said first screen for converting said reflected acoustic wavefront on said second side of said first screen to a first optical intensity image of said target object;

a housing configured to submersibly enclose said second side of said first screen and said first optical processing system; and wherein said first screen further comprises a pressure compensating layer internally adjacent to said first side to neutralize underwater pressure against said first screen.

16. The underwater camera of claim 15, wherein said first screen further partitions said underwater camera into a wet side on said first side of said first screen and a dry side on said second side of said first screen, said first optical processing system located within said dry side.

17. The underwater camera of claim 15, further comprising an acoustic lens arranged between said target object and said first screen and further configured to acoustically process said reflected acoustic wavefront.

18. The underwater camera of claim 17, wherein said first screen and said acoustic lens are integral, said first screen being a facet of said acoustic lens.

19. The underwater camera of claim 15, further comprising an acoustic source configured to generate an acoustic wavefront for impinging upon a target object.

20. The underwater camera of claim 15, wherein said first screen is configured as a monolithic screen to directly physically deform from said first side to said second side.

21. The underwater camera of claim 15, wherein said first screen is contoured on said second side to optically reflect an object beam of said first optical processing system.

22. An underwater camera, comprising:

a first screen having first and second sides, said first side configured to receive a reflected acoustic wavefront as reflected from a target object, said first and second sides further configured to physically deform in response to said reflected acoustic wavefront;

a first optical processing system optically coupled to said second side of said first screen for converting said reflected acoustic wavefront on said second side of said first screen to a first optical intensity image of said target object; and wherein said first screen comprises:

an imaging screen configured to receive a reflected wavefront and physically deform in response thereto;

a pressure compensating layer internally adjacent to said imaging screen and configured to neutralize underwater pressure against said imaging screen; and a rigid backplane adjacently coupled to said pressure compensating layer and further configured for coupling with said first optical processing system.

23. An underwater camera, comprising:

a first screen having first and second sides, said first side configured to receive a reflected acoustic wavefront as reflected from a target object, said first and second sides further configured to physically deform in response to said reflected acoustic wavefront;

a first optical processing system optically coupled to said second side of said first screen for converting said reflected acoustic wavefront on said second side of said first screen to a first optical intensity image of said target object; and a second screen and a second optical processing system configured to generate a second optical intensity image of said target object, said second screen and second optical processing system spatially separated from said first screen and said first optical processing system to form a stereophonic optical image of said target object.

* * * * *